Figure 1:
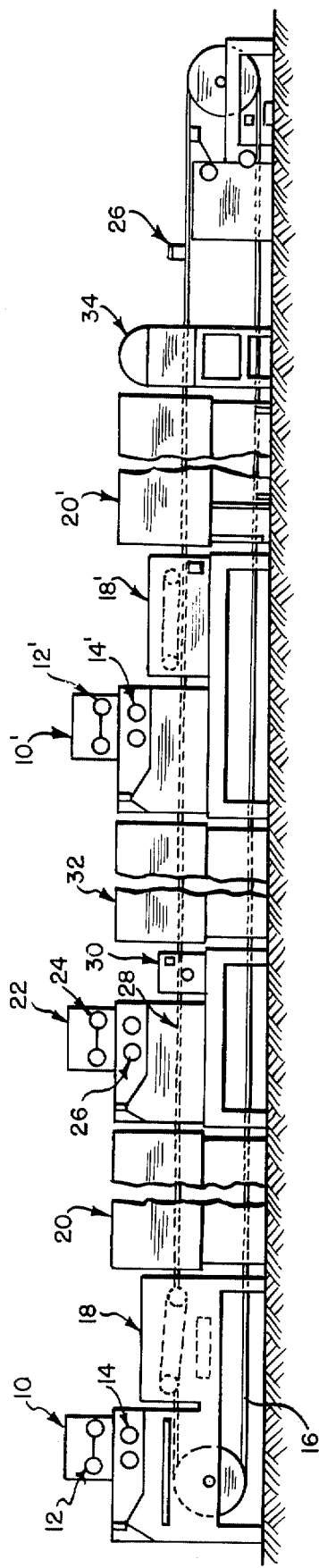

United States Patent [19]

Viera et al.

[11] 3,917,861

[45] Nov. 4, 1975

[54] PROCESS FOR PRODUCING NUTRITIOUS FOOD

[75] Inventors: Paul E. Viera, Battle Creek, Mich.; Anthony Benincasa, Zanesville, Ohio; Paul D. Halladay, Bondfield, Ill.; Diane J. LaTour, Danbury, Conn.

[73] Assignee: General Foods Corporation, White Plains, N.Y.

[22] Filed: Oct. 24, 1973

[21] Appl. No.: 409,214

[52] U.S. Cl. .................. 426/274; 426/362; 426/454
[51] Int. Cl.² ............................................ A23G 3/00
[58] Field of Search ......... 426/89, 96, 99, 141, 146, 426/208, 289, 292, 274, 362, 453, 454, 496, 502, 293, 297, 343, 512, 367

[56] References Cited
UNITED STATES PATENTS

| | | | |
|---|---|---|---|
| 1,975,326 | 10/1934 | Loose et al. | 426/502 |
| 2,264,115 | 11/1941 | Grainger et al. | 426/502 |
| 3,655,410 | 4/1972 | Forkner | 426/343 |
| 3,779,772 | 12/1973 | Forkner | 426/454 |

Primary Examiner—A. Louis Monacell
Assistant Examiner—R. B. Penland
Attorney, Agent, or Firm—Bruno P. Struzzi; Thomas V. Sullivan; Michael J. Quillinan

[57] ABSTRACT

A nutritious, laminated, multi-phased food consisting of a plurality of continuous discrete layers is formed, at least one of the layers having cereal particles bonded together by a fat-based binder system and the mixture being gradually continuously compacted in an acute angle formed between endless planar belts operative to apply unidirectional pressure approximately normal to the mixture. The cooled layer permits continuous sheeting to a form which is dimensionally and otherwise stable for lamination with a nutritious filling.

10 Claims, 2 Drawing Figures

U.S. Patent    Nov. 4, 1975    3,917,861

PROCESS FOR PRODUCING NUTRITIOUS FOOD

BACKGROUND OF THE INVENTION

It would be desirable to provide a multi-layered nutritious food product utilizing significant levels of fat and cereals and which is capable of maintaining layer identify as such. The product should retain desirable organoleptic qualities and identity despite varying normal storage and distribution temperatures for a dry grocery product. Such a product would typically comprise a layer of aggregated conventional ready-to-eat breakfast cereal flakes laminated to a filling layer. The aggregation should be in a bar or like geometric shape. The flakes should be bound together so as to occasion minimal crumbling prior to consumption or handling. It is also desirable to have a product which exhibits a cereal appearance at the surface thereof.

The multi-layered product should also provide a desired soft-moist mouth feel from one of the layers and yet contribute a crunchy cereal effect when consumed. To manufacture such a distinctive product, fats are employed to bind the cereal components. The triglyceride should not have a high melting point in the binder composition since this produces a waxy dry or greasy "hot" mouth feel. This necessitates that the binding fat have most of its triglycerides at a melting point which is generally below 100°F. Processing such a binder composition with cereal flakes introduced manufacturing problems not common to conventional confectionary arts.

A multi-layered cereal bar aggregated with, say, a flavorful fruit incorporated in a filling as one of the layers should not be prone to excessive friability and a tendency toward generating cereal fines which detract from consumer appeal. By reason of the plasticity of the fat in the binder system, the cereal-binder mixture must be delicately handled during lamination to the filling layer.

Accordingly, it is a principal object of the present invention to provide a multi-layered lamination of, say, a three-layered cereal-based nutritious food which, despite limitations in compositing the product, stemming from the character of the fat and the cereal pieces, will not undergo such migration of the binder as will result in a loss of the layer definition through the forming process. Thus, during manufacture, the binder system per se should be relatively stable and during packaging and distribution should cause the cereal layer to retain layer definition despite elevated temperatures.

Another object of the invention to provide a multi-layered laminated foodstuff one of whose layers is a cereal-binder mixture which when aggregated with a fat-based filling having incorporated therein such flavorants as fruit, nut meats and the like, will remain organoleptically efficacious in accordance with the foregoing product prerequisites.

STATEMENT OF THE INVENTION

In accordance with this invention, a cereal-binder mixture of desired width is continuously applied to a flat moving continuous band (steel) at a predetermined temperature, height and consistency beneath the continuous pressure of a flexible endless planar belt of comparable width positioned stationarily over the band and synchronously driven relative thereto in order that the belt will intersect the band at a relatively acute angle which applies pressure gradually and substantially unidirectionally normal to the cereal-binder layer thus produced. In effecting this gradual compacti, the planar belt will be of a sufficient length to gener a gentle compaction and the band will be driven at l ear speed substantially equal to that of the belt so as avoid eccentricities in the pressure applied normal the overall plane of the cereal-binder material. Gen ally, the acute angle will be less than 30° and will v from product to product in accordance with prop tions and type of ingredients in the cereal-binder m ture.

The compacted layer which will be principally co posed of cereal particles (the term "cereal" in this c text being synonymous with dry breakfast cereals commerce and ranging anywhere from flakes, the p ferred form, to puffs, extrudates and the like) will th be shaped with a minimum of lateral disturbence that a controlled consistent and uniform compaction effected. It is thus practicable in accordance with t present invention by reason of the uniformity achiev to form the layer and cool it to ambient room rempe tures whereafter a filling may be deposited on the la and a second like layer may be deposited on the filli thus sandwiching the filling.

It will be essential when practicing the invention achieve such fat characteristics in the binder that it w not unduly or prematurely migrate both in forming bar of uniform consistency and appearance and dist bution thereof. It is a feature of this invention that binding composition is employed consisting essentia of a triglyceride-sugar matrix which is bound or stal lized by discrete particles of silicon dioxide and a bric ing compound as that term is described and referred in U.S. Pat. No. 3,669,681 issued June 13, 1972 Shoaf, et al, entitled Shortening Composition Contai ing Silicon Dioxide and a Bridging Agent and Bak Goods Containing Same. It appears that this uniq binding system induced through an interaction betwe the triglyceride, the silicon dioxide and the bridgi compound, say, a glycerol, and water is operative stabilize the fat despite its relatively temperature sen tive dilation characteristics and solids index so that it localized in a particular cereal portion and advant geously does not contribute towards weeping of the t glyceride mass, say, 50–65% hydrogenated vegetab oil and thereby avoids package staining, loss of lay distinctness and an overall unsightly product, the ter weeping being synonomous with bleeding or other ex dation.

Advantageously, this binder is found to functi quite beneficially when a nutritious protein source included therein and indeed many protein sources su as egg albumin, water soluble extracts of soy prote and like seed- or legume-based meals and combinatio thereof are found to contribute an increase in the bin ing capacity of the silicon dioxide and the bridgi compound.

Depending upon the proportion of moisture prese in the binder, it may be desirable as indicated herein ter to employ an abbreviated drying step at the termin stages of binder/cereal formation, the moisture conte in any event being ultimately below 5% in the binder. has been found that the foregoing binder system is re sonably free of rancidification provided the cere components associated therewith and the total cor posite produced therefrom in a multi-layered form h an overall moisture content below 6%.

Most advantageously, it has also been found that l virtue of the silicon dioxide and the bridging compour 1 percentage of a triglyceride fat, say, a hydroge- vegetable oil like cottonseed oil will not unduly sorbed into the cereal particles such that the ce- /ill not undergo an undesired loss of crispness due becoming soggy through fat penetration.

: unique combination of ingredients yielded by the nt invention will be a highly palatable and nutri- flavorful bar or a like form capable of being con- 1 as such, easy to handle and relatively shelf stable eriods of 3 to 6 months depending upon antici- temperatures for dry grocery packaging; indeed, ist applications constituting the best modes here- r described, the stability will be 6 to 12 months the anticipated storage temperatures of below in a polyethylene-coated aluminum foil enwrap- or packaging material of like water vapor and gas nission protection. The invention is adaptable to ling the nutrition of a total breakfast ration and be formulated to provide a more or less instant to eat breakfast lamination providing crunchy on the outside and an intermediate fruit-flavored . A crisp rice cereal and a banana-flavored filling heat flake and a blueberry flavored filling may be led with like confectionary appeal. Preferably bar forms will be individually foil wrapped to pro- he maximum nutrition and flavor.

ere a nutritionally complete breakfast ration is in- d, the bar may have included in either the filling cereal layer both vitamin and mineral supple- itions — typically one third of the determined MDR's.

/pical and preferred bar ration will have between d 75 parts by weight cereal, 5 and 20 parts by t dry milk solids, sodium caseinate and/or soy n extract, between 5% and 20% shortening and en 5% and 20% sugar, moisture being also added in processing.

rder to maintain bar integrity during the compos- process to be described hereinafter, it will be im- it that processing temperatures not exceed 212°F period longer than 5 minutes during any drying tion that may be practiced; thus, during forma- f the composite should it be necessary that mois- ie removed from the binder-cereal layer and the iediate filling layer, the composite should not be ed to a temperature of in the order of 212°F for od in excess of 5 minutes; temperatures substan- n excess of this range should be avoided since the or binder fat will melt and weep out of the prod- using it to lose layer definition or intended shape ulk.

better appreciate the function of respective ingre- , the following will essentially represent the con- ons of the characterising ingredients of the nutri- bar.

each cereal layer:

CEREAL cereal component will lend its own distinctive , bulk structure, texture and appearance and oth- will be a matter of choice, although in practicing st modes of the present invention it will be pre- that flake cereals like corn or oat flakes be sub- d to a bulk specified hereinafter.

BINDER riglyceride-hydrogenated vegetable oil or like tri- ide having a sharp plastic range and a majority of its triglycerides' melting at or below body temperature will contribute desired texture and flavor, and avoid excessive waxy fatty mouth feel; the dititation criteria herein will tolerate up to 45% of the triglycerides having a melting point above body temperature and up to 150°F, but preferably below 120°F.

2. Colloidal Silicon Dioxide

This agent will serve as a fat gelling agent preventing fat separation during compositing and storing the bar ingredients.

3. Bonding Agent

This agent effects a bond between the triglyceride and the silicon dioxide, a typical bonding agent being glycerol.

4. Sugar

Sucrose in solution combines with water to provide a bonding adjunct and contributes flavor together with other optional additives such as salt, corn syrup solids and like cereal starch digests.

5. Water allows water dissolution of the sugar for combination with other flavoring solids and for distribution of the remaining ingredients of the binder.

In addition to the above, silicon dioxide and the bonding agent will regulate fat migration and minimize any loss of crispness in the cereal.

FILLER

The following are the components and characteristics of the filling layer.

1. Triglyceride — hydrogenated vegetable oil of a type like that of the binder aforesaid.

2. Colloidal silicon dioxide and bonding agent — like functions as in the binder aforesaid.

3. Sugar — functions as aforesaid in the cereal layer.

Protein sources such as soy protein isolates or extracts preferably in a water soluble form and egg white solids serving as protein sources for nutrition as well as grain by-products like wheat germ may be included in the cereal and/or filling layers for nutritional balance. To the foregoing ingredients optional additives or variations may be employed: e.g. peanut butter, dried fruit such as freeze-dried peaches and strawberries; marshmallow, caramel, nut meats and the like may be added either to the filling or in the case of certain nut meats such as peanut butter and like nut meat spreads they may be incorporated with the binder as part of the cereal layer.

Figure 2:
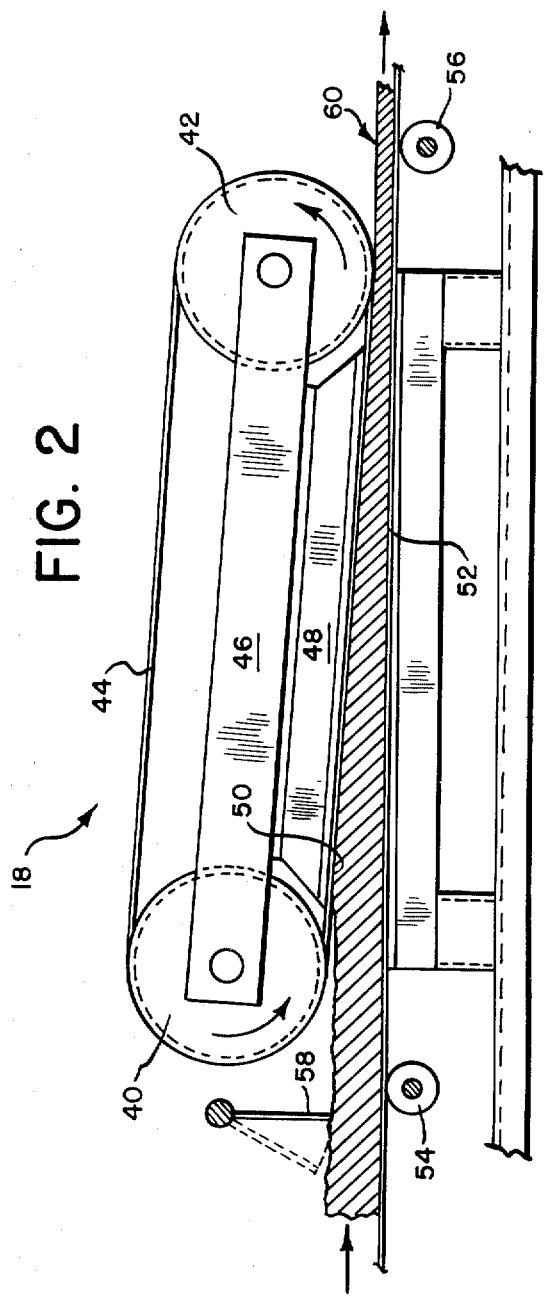

The invention will now be described by reference to the following description of the best mode thereof which description is in the context of the accompanying diagram wherein FIG. 1 an assembly of apparatus for making a three-layered bar and FIG. 2 is an enlarged elevational view of the compactor system for achieving the requisite gradual compression of the cereal-binder layers.

Referring to FIG. 1, the system will be seen to comprise cereal-binder hopper 10 equipped with heaters 12 to maintain the binder at an elevated temperature above 110°F and with metering roll 14 adapted to meter the cereal binder mixture onto continuous steel band 16. The cereal-binder mixture is fed at a rate to provide a uniform predetermined height and amount thereof as added to a compactor assembly generally shown as 18 wherein the mixture is delicately compressed as aforesaid and as will be described in reference to FIG. 2. Band 16 delivers the compacted cereal layer to cooling tunnel 20 operative to cool the compacted layer to ambient room temperatures generally below 80°F to solidify as a first cereal sheet.

Hopper 22 for the filling composition is equipped with heaters 24 and is adapted to feed through metering roll 26 the plastic molten mass of composition which is dispensed onto the previously formed solidified cereal sheet as at 28; the filling charge thus deposited is continuously leveled by means shown to provide a smooth dimensionally uniform thickness.

The first cereal layer and the filling layer are caused to pass a heater 30 serving to maintain the filling hot and molten and render the filling temperature of about 130°F so as to facilitate smoothing the filling, whence the filling and cereal enters cooling tunnel 32 in which the filling is cooled to solidify it preparatory to lamination by a second cereal/binder applicator system like the first for the top cereal layer, like reference character being primed for depicting the top cereal binder applicator system comparable to that of lower cereal binder applicator system just described.

The composite thus formed by the second cereal/binder mixture and layer being compacted onto and superjacent the filling eventually enters cooling tunnel 20 whereupon it is slit at 34 and cross cut to bar size at 36.

Referring to FIG. 2, each compactor 18 will be seen to comprise a compactor take up roll 40 and a drive roll 42 having an endless compactor belt 44 driven to provide the gradual pressure ascribed hereinabove. This assembly is mounted on a roll support beam 46 having a depending slider bed 48 adapted to maintain the lower reach of belt 44 in continuous contact as at 50 with each consecutive charge of cereal/binder on the steel band shown as 52 supported by band support rolls 54, 56. Each cereal/binder mixture enters the compactor area through product leveling gate 58 which provides a uniform depth of the cereal/binder mixture. The continuously advancing mixture on band 52 is introduced to the gradually narrowing gap or nip between the under reach 50 of belt 44 and the steel band 52 until it exits from the compactor assembly as at 60 in the intended densified condition. It will be noted by virtue of the acute angle formed between the plane of the belt 44 and that of band 52 a gradual and progressive pressure is a applied to the charge of cereal/binder and at the same time by virtue of the synchronous and matching line speeds of both the belt and the band there is virtually no relative movement there-between such that compression is essentially in a single direction; this achieves densification while at the same time minimizing the degree of fracture that may be induced through such densification in the cereal component of the mass. At the same time, the binder itself is caused to be intimately redistributed throughout.

In a typical lamination operation the first cereal binder mixture deposited onto band 16 will have been leveled by passage through the gate referred to. The original bulk of the cereal binder mixture will eventually be reduced by ½ to ⅛ its original volume. The compacted cereal binder layer will have a minimum layer thickness of ⅛" and more typically will have a thickness of ¼–½". The degree of compaction will be controlled in order to avoid an excessive development of fines through fracture of the cereal flakes or other cereal components of the layer.

The binder cereal layer per se will be comprised in major weight percent of fat. The cereal component will bridge and thus aggregate into a structure which is porous and whose void spaces are defined by the faces of the cereal components per se and the binding fat intermediate the points or areas of contact of the cereal component. Generally the void space will represent a minor weight of the bulk volume of the compacted cereal binder mixture. The flakes may be of conventional cereal particle size where breakfast cereal flakes are employed as the principal and preferred component of the layer. However, to improve binding capacities and thus assure a more distinct and stable layer, it will be most preferred to subdivide the cereal flakes to a particle size distribution whereat a major weight percent thereof are retained on a No. 10 mesh and will pass a No. 5 mesh screen (U.S. Screen Series). In this way the bridging areas will be increased and the opportunity for fat to cause aggregation will improve; this is particularly so when the fat binder is enhanced by the inclusion of the silicon dioxide and the bridging compound.

The cereal-binder mixture will be warmed to above ambient room temperatures prior to being deposited upon the upper reach of the horizontal endless steel belt or band on which the successive charges of mixture are deposited for introduction to the initial compacting zone. By melting the fat in this mixture, it will effectively coat the flakes or other cereal component to a substantial, if not a complete, degree. As a consequence, when the mixture is compacted and thereafter cooled, the fat will solidify to bridge the flakes or other cereal components together in a relatively dimensionally stable condition.

A typical formulation for the fat phase of the cereal binder mixture is as follows:

|  |  | Range |
| --- | --- | --- |
| Hard Shortening (120°–123°F) (Hard flaked vegetable shortening) | 30% | 10–40% |
| Plastic Shortening (101–103°F) (Hydrogenated coconut, palm kernal and cotton seed oil) | 25% | 10–60% |
| Silicon Dioxide Powder | 1.2% | 0.01–1.5% |
| Glycerine | 1.0% | 0.5–1.5% |
| 6X Sugar | 32.8% | 20–40% |
| Vanilla Extract | 1.5% | 0–2% |
| Mineral Mix (Calcium Phosphate Tri-basic) (Sodium Phosphate Di-basic) (Ferrous Fumarate Potassium Iodide Magnesium Oxide) | 6.5% | 0–10% |
| Color (Red No. 3, Yellow No. 5 Yellow No. 6, Blue No. 1) |  |  |

After cooling, it will then be desired to deposit a layer of molten or plastic filling composition onto the layer of cereal binder. The filling is basically a fat-protein-sugar confectionary and typically will have its principal weight constituent as fat. Ideally the filling formulation will preliminarily be subjected to a whipping action to generate a degree of overrun and constitute lightness of texture in the eventually solidified laminate. A typical overrun is 10% to 20%. After the filling is deposited it may be allowed to cool under relatively ambient conditions, although there is relatively little change in filling temperature conditions. In production it may be advangeous to cool the filling as deposited in order to assure better shape definition and meet weight declaration requirements. Importantly, by providing a relatively cool and semi-plastic solidified condition, the filling supports a superimposed second cereal binder mixture which is applied to it while at the same time permitting sufficient penetration of the cereal components to anchor a superjacent layer thereof.

A typical formula for the filling is:

|  |  | Range |
|---|---|---|
| Hydrogenated coconut, cotton seed & soybean oil (101–103°F) | 44.4% | 40–60% |
| Pro 610 (Soy Protein Isolate) | 14.1% | 0.0–30% |
| Sugar | 24.2% | 10–40% |
| Glycerin | 0.5% | 0.05–2.0% |
| Silicon Dioxide Powder | 2.0% | 0.01–2.0% |
| Vitamin Mixture | 0.7% | 0.0–1.0% |
| Egg White Solids | 14.1% | 0.0–3.0% |
|  | 100.0% |  |

We claim:

1. Method of forming a layer of ready-to-eat nutritious food having a cereal-fat mixture wherein the cereal particles bridge with one another and aggregate to a porous structure wherein void spaces are defined by the faces of the cereal particles and the fat which comprises placing successive portions of said mixture into a moving elongated endless belt having a substantially planar upper reach, causing said mixture to advance on said belt toward a gap in a compacting zone between said belt and a second moving elongated endless belt having a substantially planar lower reach, the planes of said upper and lower reaches intersecting at an acute angle and the upper reach being spaced sufficiently proximate the mixture to have the charge initially contacted by the second belt prior to the mixture entering said gap, and gradually compacting each successive charge between the belts by causing said upper and lower belt reaches to move synchronously and passing the compacted mixture through said gap.

2. The method of claim 1 wherein the acute angle is less than 30°.

3. The method of claim 2 wherein the linear speeds of the upper and lower belt reaches are equal.

4. The method of claim 1 wherein the cereal is selected from the group consisting of flakes, puff and extrudates.

5. The method of claim 4 wherein the fat has a sharp plastic range at body temperature and is elevated above body temperature when part of the charge to the first belt.

6. The method of claim 5 wherein the compacted layer is cooled after passage through said gap.

7. The method of claim 6 wherein the fat contains silicon dioxide.

8. The method of claim 7 wherein the fat contains a bridging compound.

9. The method of claim 1 wherein the compacted layer has a fat-based filling layer continuously applied thereto to form a first laminated structure and wherein said laminated structure has a second succession of charges of a second cereal-binder mixture applied thereto by a method which comprises gradually compacting the second mixture onto the laminate in a second compacting zone operating the same as the first zone to gradually compact the second mixture and laminate it to the filling layer by passage through a second compacting gap like the first.

10. The method of claim 9 wherein the filling is first cooled after lamination sufficiently to at least partially solidify the filling surface and is then warmed to soften its surface at least partially and cause the second mixture layer to adhere to the filling.

* * * * *